(12) United States Patent
Osinski et al.

(10) Patent No.: US 10,531,421 B1
(45) Date of Patent: Jan. 7, 2020

(54) SYSTEMS AND METHODS FOR LOCATING USER EQUIPMENT DURING DISASTERS

(71) Applicant: AT&T Intellectual Property I, L.P., Atlanta, GA (US)

(72) Inventors: Matthew Osinski, Westfield, NJ (US); Sumit Maheshwari, Piscataway, NJ (US); Shuai Hao, Hillsborough, NJ (US); Zihui Ge, Madison, NJ (US); Joshua Reich, Berkeley, CA (US); Vijay Gopalakrishnan, Edison, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/212,168

(22) Filed: Dec. 6, 2018

(51) Int. Cl.
*H04W 64/00* (2009.01)
*H04W 4/90* (2018.01)
*H04W 24/08* (2009.01)

(52) U.S. Cl.
CPC ............ *H04W 64/00* (2013.01); *H04W 4/90* (2018.02); *H04W 24/08* (2013.01)

(58) Field of Classification Search
CPC ....... H04W 4/02; H04W 64/00; H04W 16/18; H04W 4/029
See application file for complete search history.

(56) References Cited

U.S. PATENT DOCUMENTS

| | | | |
|---|---|---|---|
| 9,055,547 B1 | 6/2015 | Janakiraman et al. | |
| 9,426,665 B2 | 8/2016 | Ge et al. | |
| 9,491,575 B2 | 11/2016 | Edge et al. | |
| 9,826,415 B1 | 11/2017 | Byrne | |
| 9,923,807 B2 | 3/2018 | Kodaypak et al. | |
| 9,998,856 B2 | 6/2018 | Edge | |
| 10,070,301 B2 | 9/2018 | Seenappa et al. | |
| 10,075,807 B2 | 9/2018 | Canoy et al. | |
| 2014/0128057 A1* | 5/2014 | Siomina ............... | H04J 3/0685 455/423 |
| 2014/0228057 A1* | 8/2014 | Uga ....................... | H04W 64/00 455/456.3 |
| 2015/0031388 A1* | 1/2015 | Chatterjee ............. | H04W 4/021 455/456.1 |
| 2017/0105113 A1* | 4/2017 | Seenappa ............... | H04W 24/02 |
| 2018/0061249 A1 | 3/2018 | Cui et al. | |
| 2018/0167796 A1 | 6/2018 | Raje et al. | |
| 2018/0192234 A1 | 7/2018 | Mohamed et al. | |
| 2018/0295600 A1* | 10/2018 | Kumar .................. | H04L 5/0051 |

* cited by examiner

*Primary Examiner* — Khalid W Shaheed
(74) *Attorney, Agent, or Firm* — BakerHostetler (57) ABSTRACT

Systems and methods for providing accurate data about the distribution of UEs after disaster include a movable eNodeB that is moved to at least three locations. The coordinates for the at least three locations are determined and the distance between the eNodeB and a plurality of UEs is measured. The location of each UE relative to the eNodeB is calculated based on the distance between the eNodeB and the plurality of UEs using trilateration. The coordinates for the UEs is then calculated based on the coordinates for the at least three locations and the determined location of the UEs relative to the eNodeB.

18 Claims, 7 Drawing Sheets

SYSTEMS AND METHODS FOR LOCATING USER EQUIPMENT DURING DISASTERS

TECHNICAL FIELD

The present disclosure relates generally to systems and methods for locating user equipment (UEs), and more specifically to systems and methods for locating UEs during disasters.

BACKGROUND

Reliable, constant communication is critical during a disaster. Network operators incur significant expense in providing communications capabilities during disasters such as for example hurricanes. Part of these costs are related to restoring the damaged infrastructure, for example cell sites and outside plant that had been destroyed and providing refunds to customers with no cell service.

After a disaster strikes, network operator teams seek to restore cell service to the greatest number of customers as quickly as possible, and dispatch technicians, contractors and emergency recovery assets (e.g. generators, cell on wheels). Due to the lack of cell service, network operator teams must rely on historical network usage to determine what to fix first. As a result, a damaged cell site that historically served a large number of customers will receive a higher priority on the dispatch list. This use of historical information to generate a priority list in a disaster environment results in sub-optimal dispatches, since customers' day-to-day behavior changes dramatically during and after a disaster. For example, instead of following normal daily routines, people may have been ordered to evacuate, or perhaps have bunkered down in their home or at a local shelter for several days. These types of changes are not captured in historical data.

Network operators have utilized the Service Impact Analyzer (SIA) to determine the number of customers that utilize a given cell site (see for example U.S. patent application Ser. No. 14/088,279). SIA may analyze over 3 months' worth of cell site key performance indicators to generate this number and Radio Access Network teams utilize this data to generate a cell site priority list. Related to disasters, many companies also perform aerial surveys of an area, and use vision related systems, such as cameras, LIDAR or infrared technology, to generate pictures and locate people. However, these systems do not provide accurate data about the distribution of UEs after a disaster to generate inaccurate cell site priority list.

There is a need to provide accurate localization information about the distribution of UEs after a disaster for among other things generating a cell site priority list or providing the information to first responders.

SUMMARY

A method providing accurate data about the distribution of user equipment after disaster is presented. One general aspect of the method includes moving an eNodeB, or a hardware/software package capable of delivering a subset of an eNodeB's functionality (particularly, the supporting the initial stages of a UE connection) to at least three separate locations. The distance of each of a plurality of UEs from the eNodeB is measured and, the coordinates of each of the plurality of UEs is calculated.

Implementations may include one or more of the following features. Moving the eNodeB to at least three locations includes disposing the eNodeB on a drone. The drone will survey an area with a goal of obtaining at least three RRC attach attempts per UE at different geographical locations. The measurement of a distance of each of a plurality of UEs at each of the at least three locations from the eNodeB may be accomplished by initiating attach procedures for each on the plurality of UEs at each of the at least three locations, and logging signaling information for each of the plurality of UEs at each of the at least three locations. The signaling information may include an identification of each of the plurality of UEs, a time stamped number of RRC attempts by each of the plurality of UEs at each of the at least three locations, and measurement of tracking information. Calculating the UE location of each of the plurality of UEs may be accomplished by a number of localization techniques, including received signal strength indicator (RSSI), fingerprinting/scene analysis (derived from RSSI measurements), angle of arrival (AoA), time of arrival, time difference of arrival (TDoA), return time of flight (RToF) and phase of arrival. The method may further include mapping the latitude and longitude of each of the plurality of UEs on a geographical map. Measurement of the latitude and longitude for each of the at least three locations may be accomplished using a global positioning system receiver. Implementations of the described techniques may include hardware or computer software on a computer-accessible medium.

One general aspect includes a system that includes a mobile eNodeB capable of being moved to at least three locations, a processor, and a subsystem that determines a longitude and latitude for each of the at least three locations. The subsystem measures at each of at least three locations a distance of each of a plurality of UEs from the mobile eNodeB and calculated coordinates for each of the plurality of UEs.

Implementations may include one or more of the following features. The eNodeB may be disposed in a drone. The system may initiate attach procedures for each on the plurality of UEs at each of the at least three locations, and log signaling information for each of the plurality of UEs at each of the at least three locations. In another aspect, the signaling information may include identification of the UEs, a time stamped number of RRC attempts, and a relative received signal strength for each UE at each of the at least three locations. The system may include program instructions to determine the distance of each of the plurality of UEs from the mobile eNodeB at each of the at least three locations, and then calculate a position of each of the plurality of UEs using known measurements of signal characteristics such as RSSI, AoA, TDoA, RToF and phase of arrival. The system may include program instructions to measure a relative received signal strength for each UE at each of the at least three locations, and then convert the relative received signal strength into a distance from the mobile eNodeB. The system further may include a display device for displaying the UE latitude and longitude of each UE on a geographical map.

DETAILED DESCRIPTION OF ILLUSTRATIVE EMBODIMENTS

Figure 1:
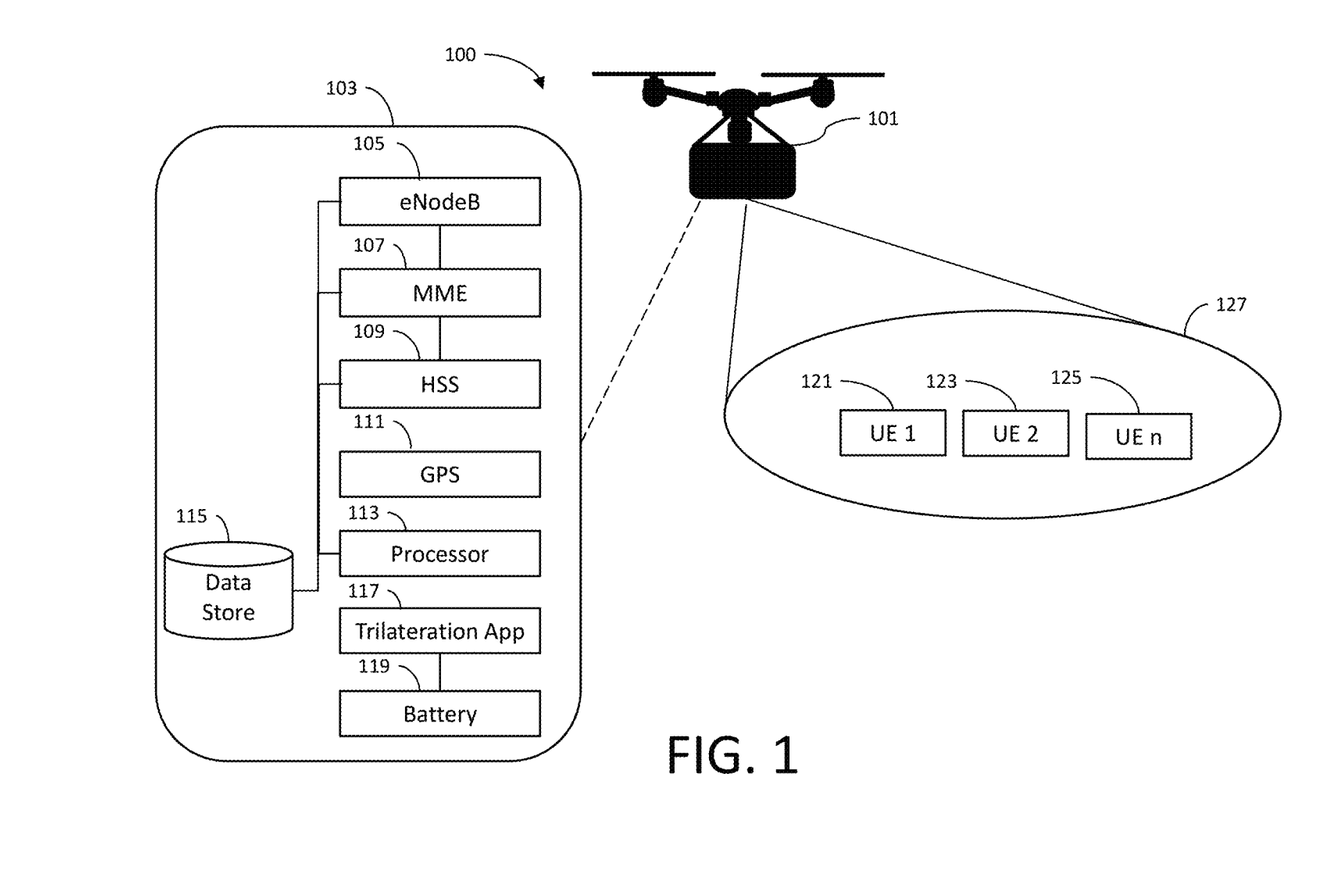
FIG. 1 is a block diagram illustrating a system for providing accurate data about the distribution of UEs after a disaster.

Illustrated in FIG. 1 is a system 100 for providing accurate data about the distribution of UEs after disaster. In a long-term evolution (LTE) network, the system 100 includes a vehicle 101 carrying a UE location determination subsystem 103. In an embodiment the vehicle may be a drone or a manned aircraft carrying the UE determination subsystem 103 in its payload. The location determination subsystem 103 may include an eNodeB 105, a mobility management entity (MME 107), a home subscriber server (HSS 109), a global positioning system receiver (GPS receiver 111), a processor 113, a data store 115; a trilateration application 117 and a battery 119. The MME 107 and HSS 109 may not be required to be included in the UE location determination subsystem 103 if backhaul for a cell site is feasible for the entire duration of the flight.

The eNodeB 105 is a device connected to the mobile phone network that communicates directly wirelessly with UEs, much like a base transceiver station (BTS) in GSM networks. eNodeB 105 is responsible for all radio-related functions, which can include Radio resource management (RRM); Header Compression; Security and Connectivity to the evolved packet core (EPC). RRM covers all functions related to the radio bearers, such as radio bearer control, radio admission control, radio mobility control, scheduling and dynamic allocation of resources to UEs in both uplink and downlink. Header Compression helps to ensure efficient use of the radio interface by compressing the IP packet headers that could otherwise represent a significant overhead, especially for small packets such as VoIP. Security is provided by encrypting all data sent over the radio interface. Connectivity to the EPC consists of the signaling toward MME and the bearer path toward the S-GW.

MME 107 is the control node that processes the signaling between the UE and the core network of the LTE network. The protocols running between the UEs and the core network are known as the Non Access Stratum (NAS) protocols. MME 107 is responsible for initiating paging and authentication of the UEs. MME 107 retains location information at the tracking area level for each UE and then selects the appropriate gateway during the initial registration process.

HSS 109 contains users' SAE subscription data such as the EPS-subscribed quality of service profile and any access restrictions for roaming. HSS 109 provides UE subscriber data repository, authentication information, and routing information services. It also holds information about the packet data networks (PDN) to which the user can connect. This could be in the form of an access point name (APN) (which is a label according to domain name system (DNS) naming conventions describing the access point to the PDN) or a PDN address (indicating subscribed IP address(es)). In addition, the HSS holds dynamic information such as the identity of the MME to which the user is currently attached or registered. The HSS may also integrate the authentication center (AUC), which generates the vectors for authentication and security keys.

GPS receiver 111 is a device comprising a receiver and algorithms to provide location using a global navigation satellite system. The Global Positioning System (GPS) is a network of about 30 satellites orbiting the Earth at an altitude of 20,000 km. Wherever the GPS receiver 111 is located, at least four GPS satellites are 'visible' at any time. Each one transmits information about its position and the current time at regular intervals. These signals, travelling at the speed of light, are intercepted by the GPS receiver 111, which calculates how far away each satellite is based on how long it took for the messages to arrive. Once GPS receiver 111 has information on how far away at least three satellites are, your GPS receiver can pinpoint your location using trilateration.

Processor 113 is the logic circuitry that responds to and processes the basic instructions that drive a computer.

Data store 115 is any type of memory device that stores data including, a flash type of memory (flash memory type), hard disk type (hard disk type), a multimedia card micro type (multimedia card micro type), a card type memory (for example, example SD or XD memory), RAM (Random Access memory, RAM), SRAM (Static Random Access memory), ROM (Read-Only memory, ROM), EEPROM (Electrically Erasable Programmable Read-Only memory), PROM (Programmable Read-Only memory), a magnetic memory, a magnetic disk, or an optical disk of at least one type of storage medium.

Trilateration application 117 may be a software program for calculating the position of a UE from RSSI measurements from three eNodeB locations. The program may include algorithms for converting RSSI measurements into distance and converting the distances into a location of the UE relative to the eNodeB using trilateration. The program may include instructions to calculate the coordinates of each UE based on the coordinates of the three locations of the eNodeB and the calculated location of each UE relative to the eNodeB.

The RSSI approach can be used to calculate a distance d between a transmitter and a receiver in accordance with the following formula, where n is the path loss exponents (2 in free space) and A is the RSSI value at a reference distance from the receiver.

$$RSSI = -10n \log_{10}(d) + A$$

Figerprinting/Scene analysis based localization techniques usually require environmental survey to obtain fingerprints or features of the environment where the localization system is to be used. Initially, different RSSI measurements are collected during an offline phase. Once the system is deployed, the online measurements (obtained during real-time) are compared with the offline measurements to estimate the user location. Usually the fingerprints or features are collected in form of RSSI or channel state information (CSI). There are a number of algorithms available that can be used to match the offline measurements with online measurement and thereafter localize the UEs.

The AoA approach uses antennae arrays (at the receiver side) to estimate the angle at which the transmitted signal impinges on the receiver by exploiting and calculating the time difference of arrival at individual elements of the antennae array. However, its accuracy deteriorates with increases in the distance between the transmitter and receiver, because a small error in the angle of arrival calculation results in a large error in the actual location estimation.

The ToA approach uses the signal propagation time to calculate the distance between the transmitter and the receiver. ToA measurements from three different reference points are used to estimate the distances between the reference points and the UE. Basic geometry can be used to calculate the location of the UE with respect to the reference points.

TDoA uses the difference in signals propagation times from different locations of a transmitter, measured at the receiver. The TDoA measurements ($T_{D(i,j)}$—from transmitters i and j) are converted into physical distance values $L_{D(i,j)} = C*T_{D(i,j)}$, where c is the speed of light. The receiver is now located on the hyperboloid given by the following equation.

$$L_{D(i,j)} = \sqrt{(X_i-x)^2+(Y_i-y)^2+(Z_i-z)^2} - \sqrt{(X_j-x)^2+(Y_j-y)^2+(Z_j-z)^2}$$

where ($X_i$, $Y_i$, $Z_i$) are the coordinates of the transmitter and (x, y, z) are the coordinates of the receiver. At least three transmitters are needed to calculate the exact location of the receiver as the intersection of the three (or more) hyperboloids. The hyperbola equations may be solved through linear regression or by linearizing the equation using Taylor series expansion.

RToF measures the round trip signal propagation time to calculate the distance between the transmitter and receiver. Upon receiving a signal from the transmitter, the receiver responds back to the transmitter, which then calculates the total round-trip ToA. Clock synchronization between the transmitter and receiver is required.

PoA approach uses the phase or phase difference of carrier signal to estimate the distance between the transmitter and the receiver. There are a number of techniques available to estimate the range or distance between the transmitter and receiver using PoA. One technique is to assume that there exists a finite transit delay D between the transmitter and receiver, which can be expressed as a fraction of the signal wavelength.

Although the embodiment described above is described with reference to an LTE network, networks using other standards may be used.

The eNodeB 105 has a range illustrated by the area of the circle 127 and communicates with a plurality of UEs illustrated by UE 1 121, UE 2 1123 and UE n 125 within that area. In the Universal Mobile Telecommunications System (UMTS) and 3GPP Long Term Evolution (LTE), UEs 117, 119 and 121 may be any device used directly by an end-user to communicate. UEs can include electronic devices such as fixed and mobile telephones, personal digital assistants, handheld or laptop computers, smartphones, televisions and similar devices that have network communications capabilities. The terms may also refer to devices that have similar capabilities but that are not readily transportable, such as desktop computers, set-top boxes, IPTVs or network nodes. The term "UE" can also refer to any hardware or software component that can terminate a communication session that could include, but is not limited to, a Session Initiation Protocol (SIP) session. The UEs connect to the base station Node B/eNodeB as specified in the ETSI 125/136-series and 3GPP 25/36-series of specifications. It roughly corresponds to the mobile station (MS) in GSM systems.

Figure 2:
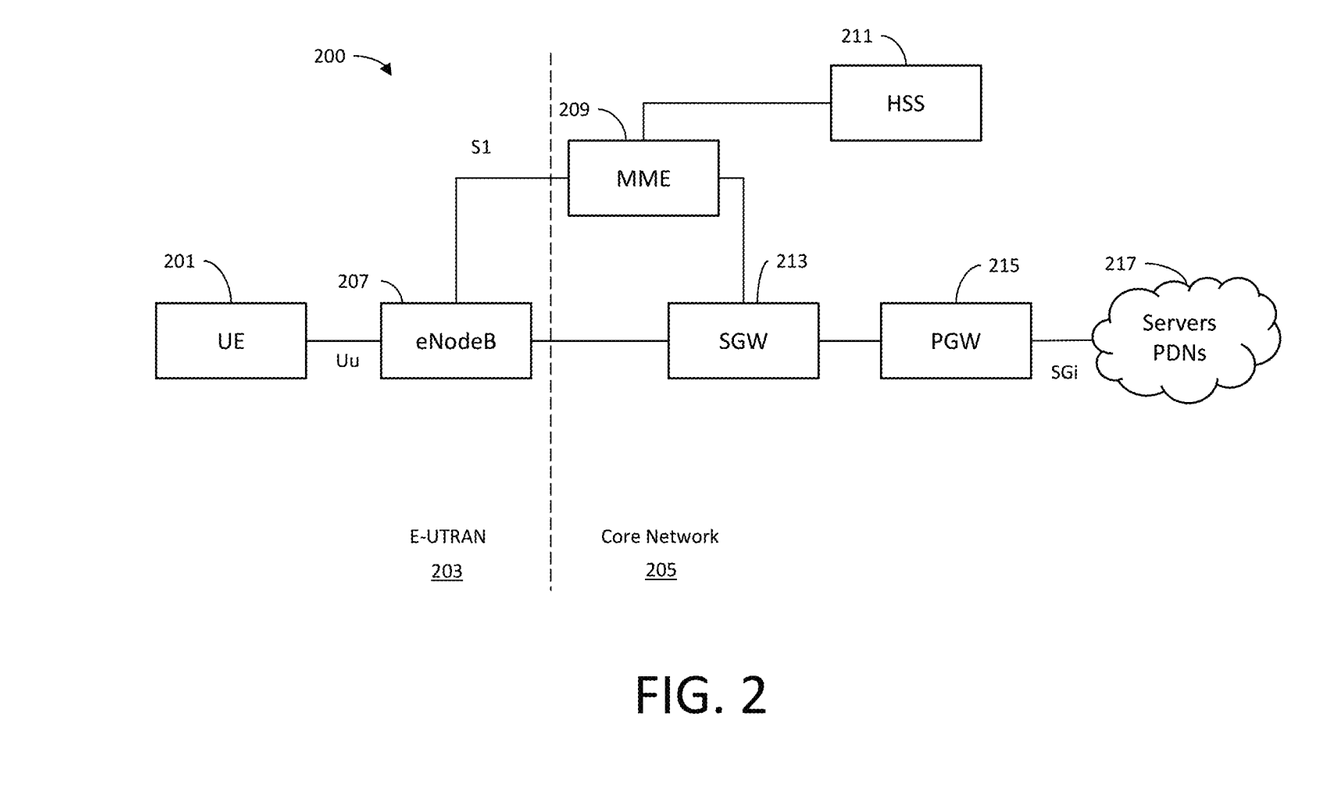
FIG. 2 is a block diagram illustrating the high-level architecture of an LTE system

FIG. 2 illustrates the high level network architecture 200 of a Long Term Evolution (LTE) system in which embodiments of the present disclosure may be implemented. The high-level network architecture of LTE is comprised of following three main components: The UE 201; The Evolved UMTS Terrestrial Radio Access Network (E-UTRAN 203); and the Evolved Packet Core (EPC 205).

E-UTRAN 203 handles the radio communications between the mobile and the evolved packet core (core network) and just has one component, the evolved base stations (eNodeB 207). Each eNodeB is a base station that controls UE 201 in one or more cells. There are two main functions supported by eNodeB 207. First the eNodeB sends and receives radio transmissions to all the UEs using the analogue and digital signal processing functions of the LTE air interface. Second, the eNodeB controls the low-level operation of all its UEs, by sending them signaling messages such as handover commands. eNodeB 201 connects with the EPC 205 by means of an S1 interface. EPC 205 includes a mobility management entity MME 209 that controls the high-level operation of the UEs by means of signaling messages and Home Subscriber Server (HSS 211). HSS 211 is a central database that contains information about all the network operator's subscribers. The serving gateway (S-GW 213) acts as a router, and forwards data between the base station and the packet data network gateway (P-GW 215). P-GW 215 communicates with the outside world i.e. packet data networks PDN 217, using SGi interface. Each packet data network is identified by an access point name (APN). EPC 201 communicates with packet data networks 217 in the outside world such as the internet, private corporate networks or the IP multimedia subsystem. The interfaces between the different parts of the system are denoted Uu, S1 and SGi.

Figure 3:
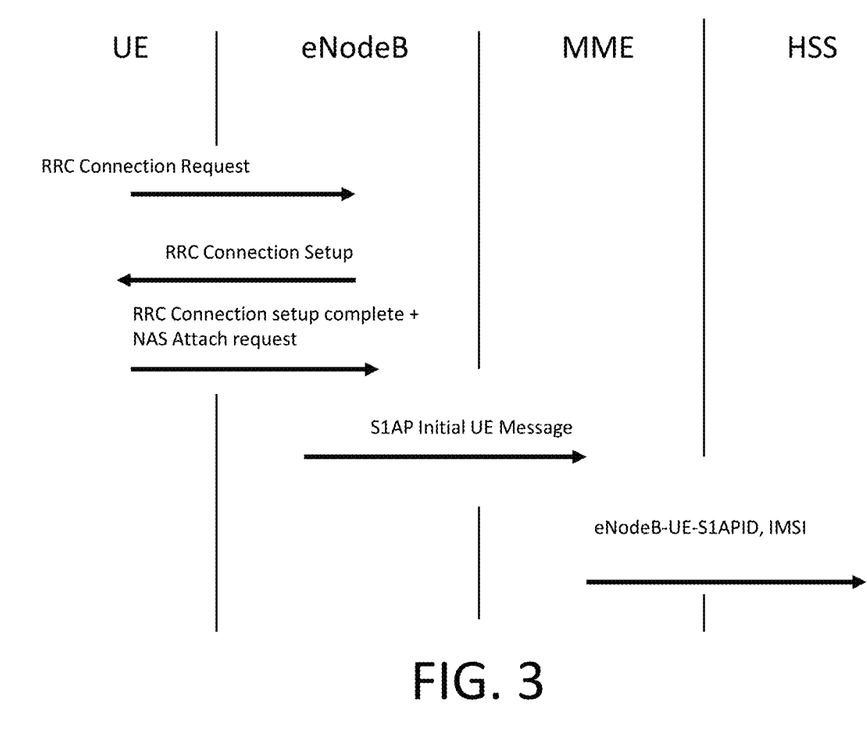
FIG. 3 is a signal flow diagram illustrating the UE connect procedure utilized by the system for providing accurate data about the distribution of UEs after a disaster.

Illustrated in FIG. 3 is a signal flow diagram illustrating the UE connect procedure utilized by the system for providing accurate data about the distribution of UEs 100 after a disaster. When the eNodeB is in range of the UE, the UE initiates and RRC connection request. RRC CONNECTION REQUEST message is used to request the eNodeB for the establishment of an RRC connection. Establishing an RRC connection in LTE typically involves the following steps: (1) UE initiates a session to the eNodeB using a random access radio network temporary identifier (RA-RNTI); (2) eNodeB assigns a Cell RNTI (used for the transmission to a specific UE) and sends timing adjustment to the UE (3) UE adjusts the timing and sends an RRC Connection Request via the Uplink Shared Channel (UL-SCH) channel (4) The eNodeB sends the RRC Connection Setup to the UE on the downlink shared channel (DL-SCH channel) and (5) the UE acknowledges the message with RRC Connection Complete message. The UE then sends an RRC Connection setup complete+NAS Attach request. In this step the UE signals the setup of the RRC connection. The message is also used to initiate the Attach procedure by sending the Attach Request as NAS Payload. The attach message contains the old globally unique temporary identifier (GUTI.) The Attach message is sent in the Initial UE message to the MME over the S1 application protocol interface (S1AP interface). The "Attach Request" is embedded in the Initial UE Message. The message also includes the PDN Connectivity Request message. The Tracking Area Identify (TM) and E-UTRAN Cell Global Identifier (ECGI) are also included. The eNodeB uses the eNodeB-UE-S1APID to uniquely identify the UE. Since the UE identified itself with GUTI and the MME has changed since detach, the new MME uses the GUTI received from the UE to derive the old MME, and send an Identification Request (old GUTI, complete Attach Request message) to the old MME to request the International Mobile Subscriber Identity (IMSI) a unique number identifying a subscriber. The IMSI is stored in the Subscriber Identity Module (SIM) inside the UE and is sent by the UE to the appropriate network. The IMSI is used to acquire the details of the UE in the Home Location Register (HLR) or the Visitor Location Register (VLR).

Figure 4:
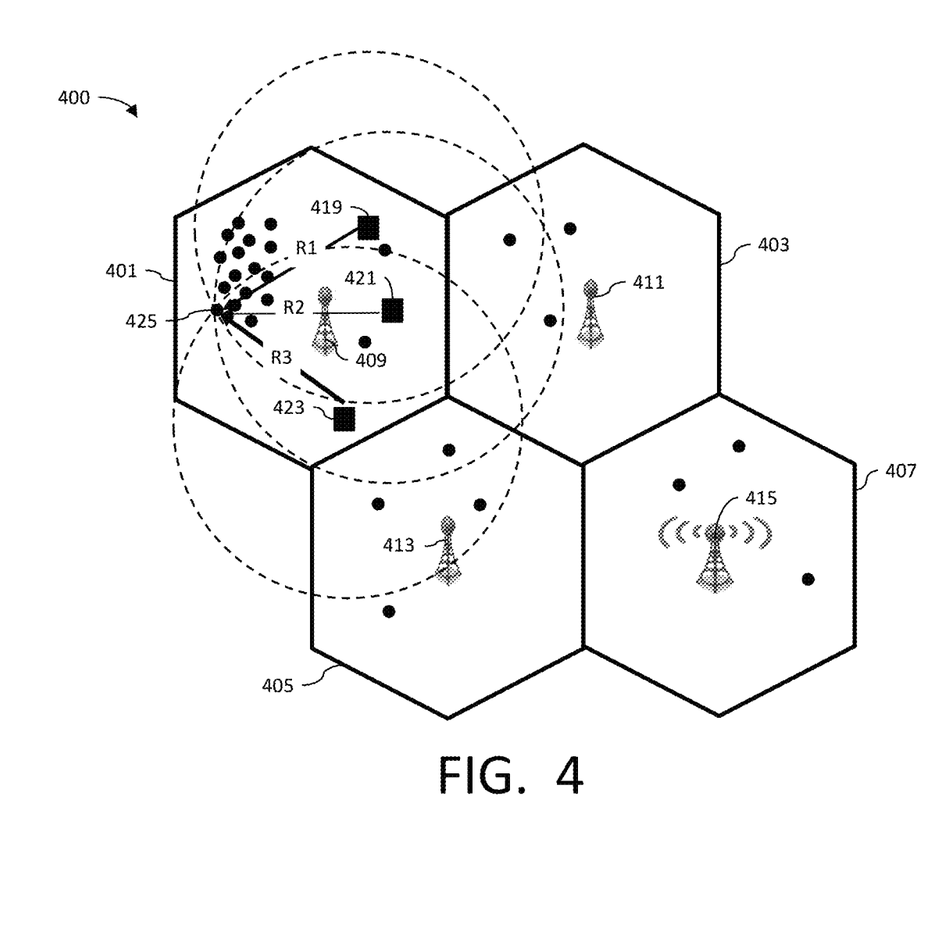
FIG. 4 is a diagram illustrating the environment in which a method of determining the location of a UE using a trilateration method may be implemented.

FIG. 4 illustrates the environment 400 in which the system 100 for providing accurate data about the distribution of UEs after disaster operates. A cellular network is illustrated with cell 401, cell 403, cell 405 and cell 407. Disposed within each cell may be a plurality of UEs represented as circular dots in FIG. 4. Associated with cell 401 is an eNodeB 409; associated with cell 403 is eNodeB 411; associated with cell 405 is an eNodeB 413; and associated with cell 407 is an eNodeB 415. As an example, in a disaster eNodeB 409, 411 and 413 may be out of service. In operation, a vehicle with an eNodeB may be moved to at least three locations represented by rectangle 419, rectangle 421, and rectangle 423. As moves through the disaster area, the eNodeB radio broadcasts and acts as a beacon. The UEs within the coverage area of the eNodeB automatically begin the 3GPP attach procedure. The attach procedure and logs containing the signaling information over the Uu interface are then collected and stored. The information collected includes the timestamped number of RRC attempts, UE to unique IMSI mapping, the UE RSSI and the geographical position of the eNodeB.

In one embodiment, the system may make Received Signal Strength Indicator, (RSSI) measurements with respect to each of the plurality of UEs in proximity to the eNodeB on the drone. The signal strength depends on distance and broadcasting power value. Three RSSI measurements are collected for each IMSI, the distance from the aerial eNodeB is calculated, and a latitude/longitude is determined for the IMSI using trilateration techniques. In addition to the RSSI measurements, the number of RRC attempts are associated to a geographical bin. Distance can be calculated using a Ray tracing formula to find out the distance from the RSSI measurements:

$$d(x)=10^{[((RSSI(1)-RSSI(x))/10*n]}$$

Later, the following formula is used to calculate distance from the RSSI which includes the frequency of operation $$d(x)=10^{[(RSSI(1)-F_m-RSSI(x)-10*n*log10(f)+30*n-32.44)/10*n]}$$

Here, d(x) is the distance of UE, x from the eNodeB where the received signal strength is RSSI(x). The RSSI(1) is the signal strength at 1 meters from the eNodeB. $F_m$ is the fading margin. 'n' is the path loss exponent which is 2-4 depending upon the environment. 'f' is the frequency of operation of eNodeB. Finally, for each UE the system 100 may measure R1 (the distance from location 419 of eNodeB to the location of a UE, (for example UE425), R2 (the distance from location 421 of eNodeB to UE425), and R3 (the distance from location 423 of eNodeB to UE425). Once the three distance measurements are made for each UE, the location of each UE relative to the eNodeB can be calculated using trilateration. Trilateration is the process of determining absolute or relative locations of points by measurement of distances, using the geometry of circles, spheres or triangles. The location determination system 103 would include a software module that would register the location of the eNodeB at each point of measurement using GPS, and then calculate the location of each UE relative to the location of the eNodeB. The system 100 also determines the coordinates of the eNodeB at locations 419, 421 and 423 using the GPS receiver. The coordinates for each UE can then be calculated from the coordinates of the eNodeB and the location of each UE relative to the eNodeB. The locations of each UE may be plotted on a geographic map thus providing the concentration of UEs in a given area.

In other embodiments the measurement of the distance of the eNodeB form the UE may be accomplished by measuring AoA, TDoA, RToF or phase of arrival.

In the case of a disaster (e.g. a hurricane, an earthquake, a flood or a wildfire) a network operator seeks to restore self-service for the most number of customers as quickly as possible. The network operator will dispatch technicians, contractors and emergency recovery assets (e.g. generators, cells on wheel) to the area with the most number of customers. However, historical data about the location of customers will not be accurate because in the case of disasters may be evacuated from certain areas. So for example, customers may be moved into a shelter until the effects of the disaster can be addressed. So for example in FIG. 4 there is a heavy concentration of UEs represented by dots in cell 401. In that case the network operator would want to restore service to sell 401 before restoring service to for cells 403 and 405.

Figure 5:
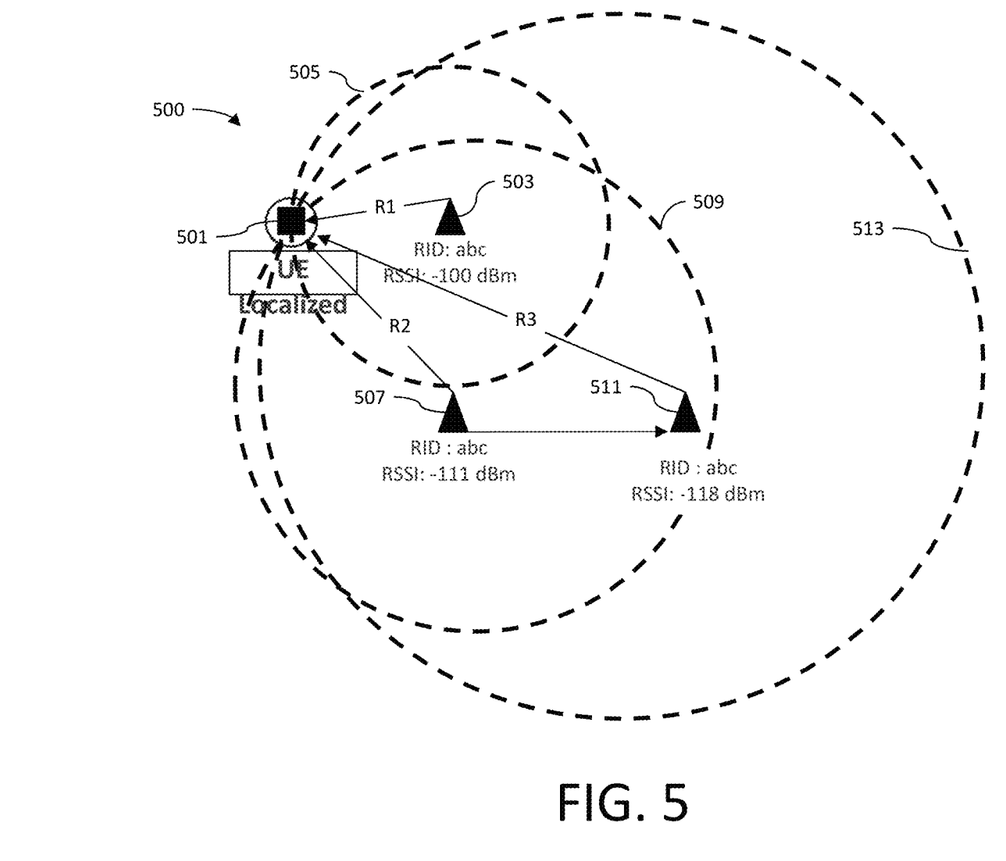
FIG. 5 is a diagram illustrating the determination of the location of a plurality of UEs using a trilateration method.

FIG. 5 illustrates a methodology 500 for determining the location of a UE 501 using RSSI. eNodeB is disposed at location 503 and the RSSI is measured. The RSSI can be converted into a distance R1 between the UEs 501 in the eNodeB at location 503. R1 can be used to define a circle 505 of the possible locations of UEs 501 relative to the eNodeB. Similarly, eNodeB is disposed at location 507 and the RSSI is measured. The RSSI can be converted into a distance R2 between the UEs 501 in the eNodeB at location 507. R2 can be used to define a circle 509 of the possible locations of UEs 501 relative to the location 507 of the eNodeB. Similarly, eNodeB is disposed at location 511 and the RSSI is measured. The RSSI can be converted into a distance R3 between the UEs 501 in the eNodeB at location 511. R1 can be used to define a circle 513 of the possible locations of UEs 501 relative to the location 507 of the eNodeB. The location of UEs 501 can be determined by the intersection of circles 505, 509, and 513.

Figure 6:
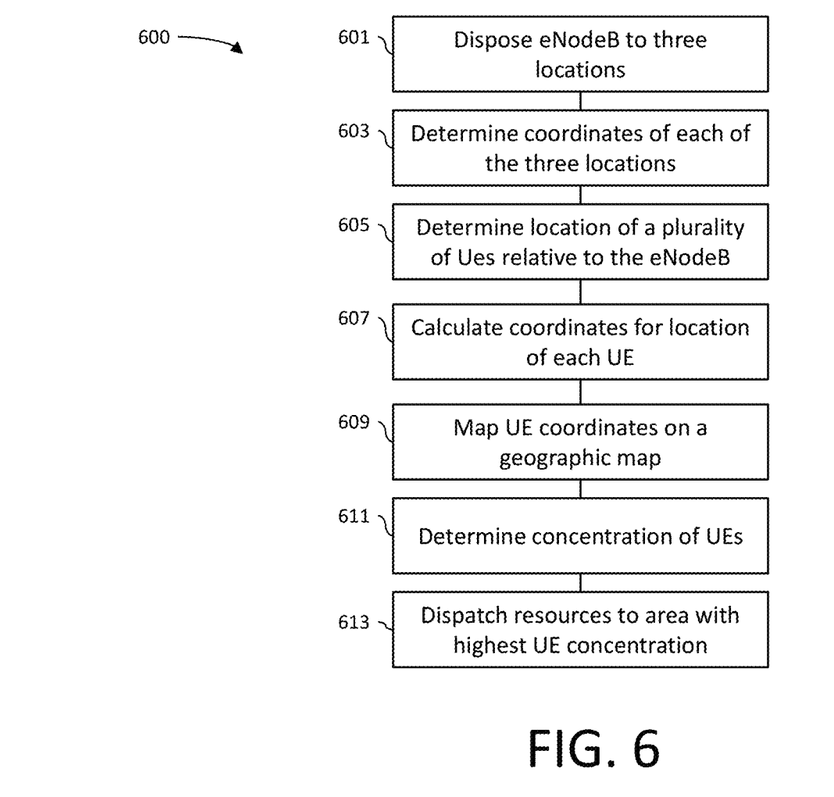
FIG. 6 is a flowchart illustrating a method for providing accurate data about the distribution of UEs after a disaster.

Illustrated in FIG. 6 is a method 600 for providing accurate data about the distribution of UEs after disaster.

In step 601 the method 600 an eNodeB is moved to at least three locations.

In step 603 the method 600 determines the coordinates of each of the at least three locations.

In step 605 the method 600 determines the location of a plurality of UEs relative to the location of the eNodeB.

In step 607 the method 600 calculates the coordinates for the location of each UE.

In step 609 the method 600 maps the UEs coordinates on a geographic map.

In step 611 the method 600 determines the concentration of UEs.

In step 613 resources are dispatched to the area with a highest UE concentration.

Figure 7:
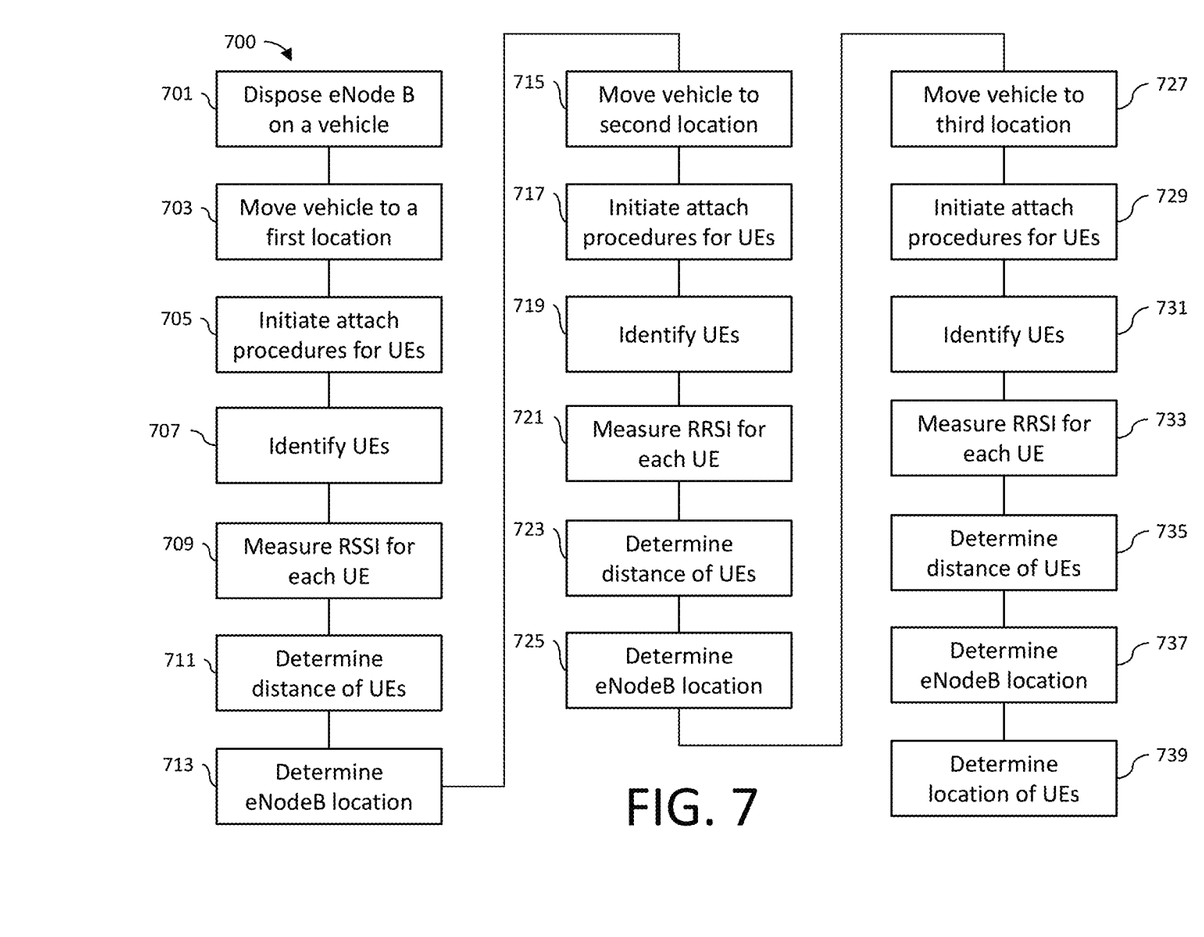
FIG. 7 is a detailed flowchart illustrating a method for providing accurate data about the distribution of UEs after a disaster.

Illustrated in FIG. 7 is a more detailed view of a method 700 for providing accurate data about the distribution of UEs after disaster.

In step 701 an eNodeB is disposed on a vehicle. The vehicle may be a manned aircraft, a drone, or a land vehicle.

In step 703 the vehicle with the eNodeB is moved to a first location.

In step 705 a plurality of UEs within range of the eNodeB initiate attach procedures for the UEs.

In step 707 the UEs are identified.

In step 709 the RSSI for each UE is measured. The method may log signaling information including an identification of each UE, a time stamped number of RRC attempts by each UE and an RSSI for each UE. In other embodiments AoA, TDoA, RToF or phase of arrival may be measured as a way to determine the locations of the UEs In step 711 the distance between the UE and the eNodeB is calculated.

In step 713 the coordinates for the first location of eNodeB is determined. This may be accomplished by the use of the GPS receiver. The identity of each UAE, the distance between each UE and eNodeB, and the coordinates for the first location of the eNodeB may be stored in a data store.

In step 715 the vehicle is moved to a second location.

In step 717 the attach procedures for the UEs in range of the eNodeB located at the second location are initiated.

In step 719 each UE is identified.

In step 721 the RSSI or other signal measurement for each UE is measured.

In step 723 the distance between each UE and the eNodeB located at the second location is calculated.

In step 725 the coordinates for the second location are determined. The identity of each UAE, the distance between each UE and eNodeB at the second location, and the coordinates for the second location of the eNodeB may be stored in a data store.

In step 727 the vehicle is moved to a third location.

In step 729 the attach procedures for the UEs in range of the eNodeB located at the third location are initiated.

In step 731 each UE is identified.

In step 733 the RSSI for each UE is measured.

In step 735 the distance between each UE and the eNodeB at the third location is calculated.

In step 737 the coordinates for the third location are determined. The identity of each UAE, the distance between each UE and eNodeB at the third location, and the coordinates for the third location of the eNodeB may be stored in a data store.

In step 739 the locations of the UEs are determined by trilateration using the distances of the UEs from the eNodeB at the at least three locations. The coordinates of the UEs are then calculated using the longitude and latitude of the location of the eNodeB.

The processor discussed above may comprise one or more processors, together with input/output capability and computer readable storage devices having computer readable instructions stored thereon that, when executed by the processors, cause the processors to perform various operations. The processors may be dedicated processors, or may be mainframe computers, desktop or laptop computers or any other device or group of devices capable of processing data. The processors are configured using software according to the present disclosure.

Each of the hardware elements may also include memory that functions as a data memory that stores data used during execution of programs in the processors, and is also used as a program work area. The memory may also function as a program memory for storing a program executed in the processors. The program may reside on any tangible, non-volatile computer-readable storage device as computer readable instructions stored thereon for execution by the processor to perform the operations.

Generally, the processors are configured with program modules that include routines, objects, components, data structures and the like that perform particular tasks or implement particular abstract data types. The term "program" as used herein may connote a single program module or multiple program modules acting in concert. The disclosure may be implemented on a variety of types of computers, including personal computers (PCs), hand-held devices, multi-processor systems, microprocessor-based programmable consumer electronics, network PCs, mini-computers, mainframe computers and the like, and may employ a distributed computing environment, where tasks are performed by remote processing devices that are linked through a communications network. In a distributed computing environment, modules may be located in both local and remote memory storage devices.

An exemplary processing module for implementing the methodology above may be stored in a separate memory that is read into a main memory of a processor or a plurality of processors from a computer readable storage device such as a ROM or other type of hard magnetic drive, optical storage, tape or flash memory. In the case of a program stored in a memory media, execution of sequences of instructions in the module causes the processor to perform the process operations described herein. The embodiments of the present disclosure are not limited to any specific combination of hardware and software.

The term "computer-readable medium" as employed herein refers to a tangible, non-transitory machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. The terms "tangible media" and "non-transitory media" each exclude transitory signals such as propagated signals, which are not tangible and are not non-transitory. Cached information is considered to be stored on a computer-readable medium. Common expedients of computer-readable media are well-known in the art and need not be described in detail here.

The forgoing detailed description is to be understood as being in every respect illustrative and exemplary, but not restrictive, and the scope of the disclosure herein is not to be determined from the description, but rather from the claims as interpreted according to the full breadth permitted by the patent laws. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. It is to be understood that various modifications will be implemented by those skilled in the art, without departing from the scope and spirit of the disclosure.

What is claimed:

1. A method comprising:
    moving an eNodeB to at least three locations in an area defined by a plurality of cells of a cellular network, wherein a plurality of UEs are disposed within the area;
    determining a longitude and latitude of the eNodeB for each of the at least three locations;
    initiating attach procedures for each UE in the area;
    measuring a signal property for each UE in the area;

logging, at each of the at least three locations, signaling information, related to the signal property from each UE to the eNodeB;

calculating a position of each UE relative to the longitude and latitude of the eNodeB for each of the at least three locations, based on the signaling information; and calculating coordinates for each UE; and determining a concentration of UEs in each cell.

2. The method of claim 1 wherein moving the eNodeB to at least three locations comprises:

disposing the eNodeB on a drone; and flying the drone to at least three locations.

3. The method of claim 1 wherein the signal property comprises one selected from among a group comprising received signal strength indication, time of flight, return time of flight, fingerprinting/scene analysis, time difference of arrival or angle of arrival for each of the plurality of UEs at each of the at least three locations.

4. The method of claim 1 wherein calculating the position of each UE comprises calculating a distance of each UE relative to the eNodeB at each of the at least three locations.

5. The method of claim 4 wherein calculating the position of each UE comprises calculating the position based on the distance of each UE relative to the eNodeB at each of the at least three locations using multilateration.

6. The method of claim 1 further comprising mapping the latitude and longitude of each of the plurality of UEs on a geographical map.

7. The method of claim 1 wherein measuring the latitude and longitude of the eNodeB for each of the at least three locations comprises measuring the latitude and longitude using a global positioning system.

8. The method of claim 1 wherein the at least three locations comprise three locations.

9. The method of claim 1 further comprising identifying each of the plurality of UEs using an international mobile subscriber identity for each of the plurality of UEs.

10. A system comprising:

a mobile eNodeB capable of being moved to at least three locations in an area defined by a plurality of cells of a cellular network;

a processor; and a memory coupled to the processor and configured to store program instructions executable by the processor to:

determine a longitude and latitude of the mobile eNodeB for each of the at least three locations in the area;

initiate attach procedures for each of a plurality of UEs in the area;

measure a property of a signal for each UE in the area;

log, at each of the at least three locations, signaling information related to the signal property from each UE to the mobile eNodeB;

calculate a position for each UE, relative to the longitude and latitude of the mobile eNodeB for each of the at least three locations based on the signaling information;

calculate coordinates for each UE; and determine a concentration of UEs in each cell.

11. The system of claim 10 wherein the mobile eNodeB comprises an eNodeB disposed in a drone.

12. The system of claim 10 wherein the signaling information comprises:

an identification of each of the plurality of UEs;

a time stamped number of RRC attempts by each of the plurality of UEs at each of the at least three locations; and a measurement of a property of a signal from each of the plurality of UEs to the mobile eNodeB.

13. The system of claim 10 wherein the program instructions executable by the processor to calculate the coordinates for each of the plurality of UEs comprises instruction to:

determine a distance of each of the plurality of UEs from the mobile eNodeB at each of the at least three locations; and calculate a position of each of the plurality of UEs.

14. The system of claim 13 wherein the program instructions executable by the processor to determine the distance of each of the plurality of UEs from the mobile eNodeB at each of the at least three locations comprises instructions to:

measure a relative received signal strength or a time difference of arrival for each of the plurality of UEs at each of the at least three locations; and convert the relative received signal strength or the time difference of arrival for each of the plurality of UEs at each of the at least three locations into a distance from the mobile eNodeB.

15. The system of claim 10 further comprising a display device for displaying UE latitude and longitude of each of the plurality of UEs on a geographical map.

16. The system of claim 10 wherein the program instructions to determine the latitude and longitude of the mobile eNodeB comprises program instructions to determine the latitude and longitude using a global positioning system.

17. The system of claim 10 wherein the memory coupled to the processor and configured to store program instructions executable by the processor further comprises program instructions executable by the processor to identify each of the plurality of UEs using an international mobile subscriber identity for each of the plurality of UEs.

18. The system of claim 11 further comprising a mobility management entity disposed on the drone.

* * * * *